United States Patent [19]

Hara et al.

[11] Patent Number: 5,385,517
[45] Date of Patent: Jan. 31, 1995

[54] AIR-FUEL RATIO CONTROL SYSTEM FOR INTERNAL COMBUSTION ENGINES WITH TORQUE CONVERTER LOCK-UP

[75] Inventors: Fumio Hara; Takashi Shinchi, both of Wako, Japan

[73] Assignee: Honda Giken Kogyo Kabushiki Kaisha, Tokyo, Japan

[21] Appl. No.: 53,681

[22] Filed: Apr. 29, 1993

[30] Foreign Application Priority Data

Apr. 30, 1992 [JP] Japan .................. 4-138043

[51] Int. Cl.$^6$ .......................... F02D 1/00; B60K 41/00
[52] U.S. Cl. ...................... 477/169; 477/181
[58] Field of Search ............ 477/111, 168, 169, 107, 477/174, 181

[56] References Cited

U.S. PATENT DOCUMENTS

| | | | |
|---|---|---|---|
| 4,891,759 | 1/1990 | Kato | 477/107 |
| 5,101,786 | 4/1992 | Kamio et al. | 477/111 |
| 5,150,635 | 9/1992 | Minowa et al. | 477/43 |
| 5,213,186 | 5/1993 | Murata | 477/169 |

FOREIGN PATENT DOCUMENTS 62-59218 12/1987 Japan .

Primary Examiner—Michael Koczo
Attorney, Agent, or Firm—Nikaido, Marmelstein, Murray & Oram

[57] ABSTRACT

An air-fuel ratio control system controls the air-fuel ratio of a mixture supplied to an internal combustion engine. The engine is installed on an automotive vehicle having an automatic transmission provided with a locking-up device. The air-fuel ratio control system controls the air-fuel ratio to a predetermined air-fuel ratio leaner than a stoichiometric air-fuel ratio when the locking-up device is engaged. The air-fuel ratio control system sets the predetermined air-fuel ratio to a value depending on whether the locking-up device is fully engaged or partially engaged.

6 Claims, 13 Drawing Sheets

FIG.9

| DOUT | V | NE | KBSM |
|---|---|---|---|
| DOUT≧DLCLAFH | V>V5th | ND | KBSMV5(A/F 21.0) |
| | VNGRL≦V≦V5th | NE>NKBS | KBSMLR(A/F 21.5) |
| | | NE≦NKBS | KBSML(A/F 22.0) |
| | V<VNGRL | ND | KBSM1L(A/F 14.7) |
| 0<DOUT<DLCLAFH | V≧VNGRL | NE>NKBS | KBSMLR(A/F 21.5) |
| | | NE≦NKBS | KBSML(A/F 22.0) |
| | V<VNGRL | ND | KBSM1L(A/F 14.7) |
| DOUT=0 | ND | ND | KBSM1L(A/F 14.7) |

AIR-FUEL RATIO CONTROL SYSTEM FOR INTERNAL COMBUSTION ENGINES WITH TORQUE CONVERTER LOCK-UP

BACKGROUND OF THE INVENTION

1. Field of the Invention

This invention relates to an air-fuel ratio control system for internal combustion engines, and more particularly to an air-fuel ratio control system for internal combustion engines which are installed on automotive vehicles having automatic transmissions.

2. Prior Art

Conventionally, an automatic transmission equipped with a locking-up device is widely used for transmitting output torque from an engine to driving wheels of an automotive vehicle on which the engine is installed. The locking-up device operates to cause mechanical engagement between input and output members of a torque converter of the automatic transmission, when the automotive vehicle is in a predetermined travelling condition, to thereby reduce sliding loss of the torque converter.

An engine installed on a vehicle having such a automatic transmission equipped with a locking-up device is known, which employs means for setting the air-fuel ratio of a mixture supplied to the engine (hereinafter referred to as "the supply air-fuel ratio") to a predetermined value leaner than a stoichiometric air-fuel ratio when the locking-up device is in a directly coupled state (a state in which the input and output members of the torque converter are directly coupled with each other), to thereby reduce the fuel consumption, as disclosed e.g. in Japanese Patent Publication (Kokoku) No. 62-59218.

According to this manner of control of the air-fuel ratio, although the air-fuel ratio is controlled to the predetermined value leaner than the stoichiometric value, when the locking-up device is in the directly coupled state, it does not take into consideration a state in which the locking-up device effects loose engagement between the input and output members of the torque converter while allowing a slight degree of sliding therebetween. This results in an inconvenience of frequent changeover in the air-fuel ratio to be controlled, between the stoichiometric value and the predetermined leaner value, degrading the drivability of the vehicle.

Further, if the air-fuel ratio is always controlled to the predetermined value leaner than the stoichiometric air-fuel ratio, irrespective of the engine rotational speed or the travelling speed of the vehicle, the drivability can be degraded due to an insufficient output from the engine when the engine rotational speed is high, and surging (small vibrations of the engine caused by variation in output torque from the engine) can occur due to an unstable combustion of the mixture when the travelling speed of the vehicle is high.

SUMMARY OF THE INVENTION

It is the object of the invention to provide an air-fuel ratio control system for an internal combustion engine, which is capable of properly controlling the air-fuel ratio of a mixture supplied to the engine when the locking-up device of the automatic transmission is in an engaged state, to thereby reduce the fuel consumption while eliminating inconveniences with conventional engines, such as degraded drivability.

To attain the above object, the present invention provides an air-fuel ratio control system for an internal combustion engine, the engine being installed on an automotive vehicle having an automatic transmission provided with a locking-up device, the control system controlling the air-fuel ratio of an air-fuel mixture supplied to the engine to a predetermined air-fuel ratio leaner than a stoichiometric air-fuel ratio when the locking-up device is engaged.

The air-fuel ratio control system according to the present invention is characterized by comprising air-fuel ratio-setting means for setting the predetermined air-fuel ratio to a value depending on whether the locking-up device is fully engaged or partially engaged.

Preferably, the air-fuel ratio-setting means sets the predetermined air-fuel ratio according to rotational speed of the engine.

Preferably, the air-fuel ratio-setting means sets the predetermined air-fuel ratio according to travelling speed of the vehicle.

Preferably, the air-fuel ratio control system includes means for setting the air-fuel ratio of the mixture to a leaner value over a predetermined range of load on the engine when the load on the engine is increasing than when the load on the engine is decreasing.

In the case where the engine includes an exhaust gas recirculation system, and the air-fuel ratio control system includes an EGR air-fuel ratio-setting means for setting the air-fuel ratio of the mixture to a value suitable for operation of the exhaust gas recirculation system, it is preferred that the air-fuel ratio-setting means sets the predetermined air-fuel ratio to the value depending on whether the locking-up device is fully engaged or partially engaged, when the EGR air-fuel ratio-setting means is not in operation.

The above and other objects, features and advantages of the invention will become more apparent form the ensuing detailed description taken in conjunction with the accompanying drawings.

BRIEF DESCRIPTION OF THE DRAWINGS

FIG. 9 shows a diagram which is useful in explaining how the air-fuel ratio control system operates according to the subroutine of FIG. 7;

DETAILED DESCRIPTION

The invention will now be described in detail with reference to drawings showing an embodiment thereof.

Figure 1:
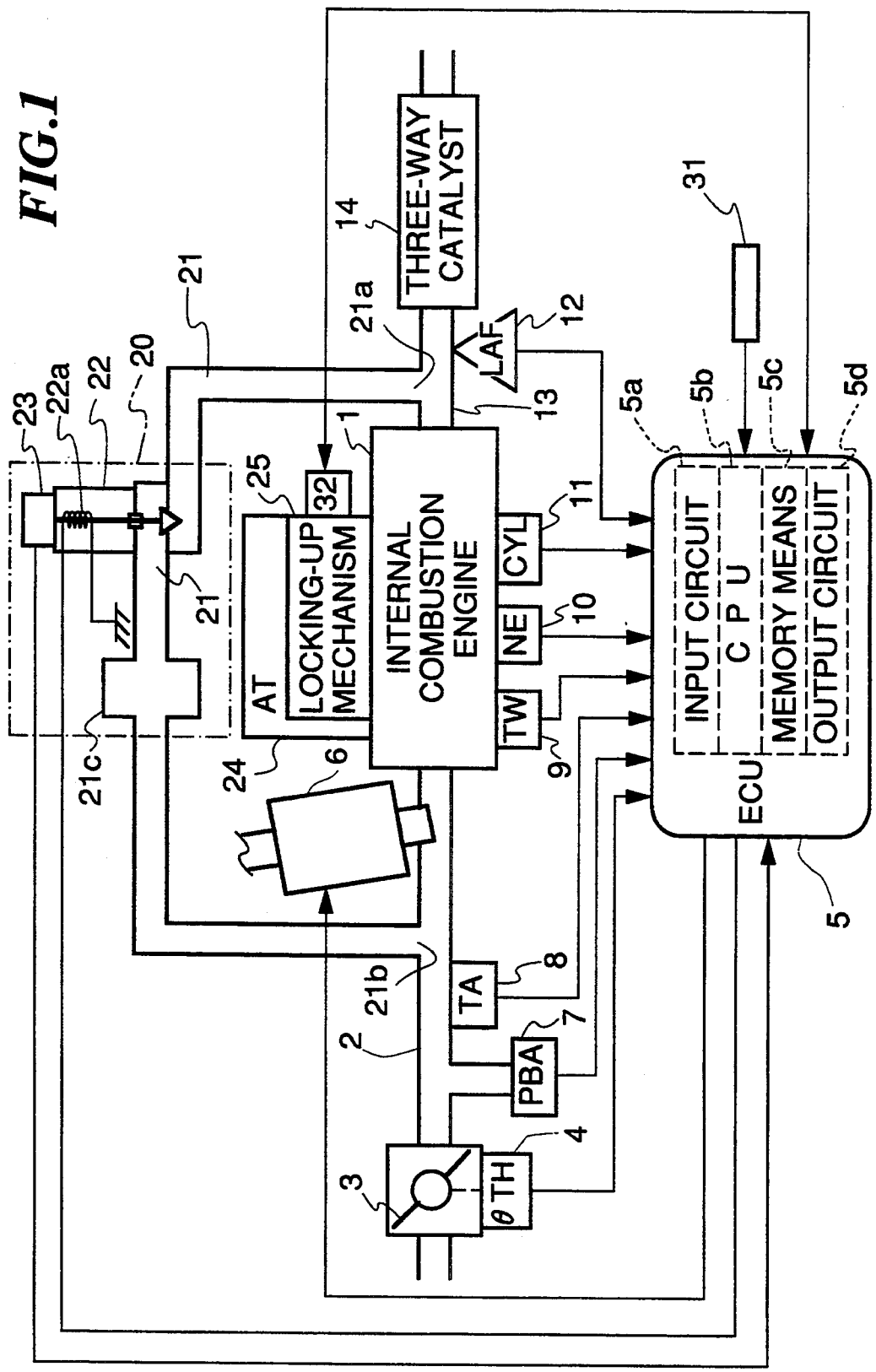
FIG. 1 is a schematic diagram showing the whole arrangement of an internal combustion engine and an air-fuel ratio control system therefor according to an embodiment of the invention.

Referring first to FIG. 1, there is illustrated the whole arrangement of an air-fuel ratio control system for an internal combustion engine (hereinafter simply referred to as "the engine") 1 incorporating an exhaust gas recirculation system, according to the embodiment of the invention. The output torque from the engine 1 is transmitted to driving wheels of an automotive vehicle on which the engine 1 is installed, via an automatic transmission 24 provided with a locking-up mechanism 25.

The engine has four cylinders, not shown, for instance. Connected to the cylinder block of the engine 1 is an intake pipe 2 in which is arranged a throttle valve 3. A throttle valve opening ($\theta$TH) sensor 4 is connected to the throttle valve 3 for generating an electric signal indicative of the sensed throttle valve opening and supplying same to an electronic control unit (hereinafter simply referred to as "the ECU") 5 for controlling the engine.

Fuel injection valves 6, only one of which is shown, are inserted into the interior of the intake pipe 2 at locations intermediate between the cylinder block of the engine 1 and the throttle valve 3 and slightly upstream of the respective intake valves, not shown. The fuel injection valves 6 are connected to a fuel pump, not shown, and electrically connected to the ECU 5 to have their valve opening periods controlled by signals therefrom.

Further, an intake pipe absolute pressure (PBA) sensor 7 is provided in communication with the interior of the intake pipe 2 at a location immediately downstream of the throttle valve 7 for supplying an electric signal indicative of the sensed absolute pressure within the intake pipe to the ECU 5. An intake air temperature (TA) sensor 9 is inserted into the intake pipe 2 at a location downstream of the intake pipe absolute pressure sensor 7 for supplying an electric signal indicative of the sensed intake air temperature TA to the ECU 5.

An engine coolant temperature (TW) sensor 9 formed of a thermistor or the like is inserted into a coolant passage filled with a coolant and formed in the cylinder block, for supplying an electric signal indicative of the sensed engine coolant temperature TW to the ECU 5. An engine rotational speed (NE) sensor 10 and a cylinder-discriminating (CYL) sensor 11 are arranged in facing relation to a camshaft or a crankshaft of the engine 1, neither of which is shown. The engine rotational speed sensor 10 generates a pulse as a TDC signal pulse at each predetermined crank angle whenever the crankshaft rotates through 180 degrees, while the cylinder-discriminating sensor 11 generates a pulse at a predetermined crank angle of a particular cylinder of the engine, both of the pulses being supplied to the ECU 5.

A three-way catalyst 14 is arranged in an exhaust pipe 13 connected to an exhaust port of the engine 1 for purifying noxious components such as HC, CO and NO$_X$. An LAF sensor 12 as an exhaust gas ingredient concentration sensor is mounted in the exhaust pipe 13 at a location upstream of the three-way catalyst 14, for supplying an electric signal having a level approximately proportional to the oxygen concentration in the exhaust gases to the ECU 5.

Further connected to the ECU 5 is a vehicle speed sensor 31 for detecting the travelling speed of an automotive vehicle on which the engine 1 is installed, and supplying an electric signal indicative of the sensed travelling speed thereto.

Also connected to the ECU 5 is an electromagnetic valve 32 provided for controlling the state of engagement of the locking-up mechanism of the automatic transmission, and the electromagnetic valve 32 is supplied with an ON/OFF control signal from the ECU 5 so as be energized and deenergized according to the duty ratio of the ON/OFF control signal.

Next, an exhaust gas recirculation system 20 will be described.

The exhaust gas recirculation system 20 has an exhaust gas recirculation passage 15 which is communicated at an end 21a thereof with the exhaust pipe 13 at a location upstream of the three-way catalyst 14 and at the other end 21b thereof with the intake pipe 2 at a location downstream of the throttle valve 3.

An exhaust gas recirculation control valve 22, which controls an amount of exhaust gas to be recirculated, and bulk chamber 21C are arranged across the exhaust gas recirculation passage 21. The exhaust gas recirculation valve 22 is an electromagnetic valve having a solenoid 22a which is electrically connected to the ECU 5 such that the valve opening thereof is linearly changed in proportion to the current amount of a control signal from the ECU 5. A lift sensor 23 is connected to a valve body of the exhaust gas recirculation valve 22 for supplying a signal indicative of the sensed valve opening to the ECU 5.

The ECU 5 operates to determine operating conditions of the engine based on the above-mentioned signals indicative of operating parameters of the engine supplied from the above-mentioned sensors, and supplies the control signal to the solenoid 22a of the exhaust gas recirculation control valve such that the difference between a desired value (valve opening command value) LCMD of valve opening of the exhaust recirculation control valve 22, set in response to the intake pipe absolute pressure PBA and the engine rotational speed NE and an actual value LACT of valve opening of the exhaust gas recirculation control valve 22 detected by the lift sensor 23, is reduced to zero.

The ECU 5 comprises an input circuit 5a having the functions of shaping the waveforms of input signals from various sensors as mentioned above, shifting the voltage levels of sensor output signals to a predetermined level, converting analog signals from analog-output sensors to digital signals, and so forth, a central processing unit (hereinafter referred to as "the CPU") 5b, memory means 5c formed of a ROM storing various operational programs which are executed in the CPU 5b, and various maps and tables, referred to hereinafter, and a RAM for storing results of calculations therefrom, etc., and an output circuit 5d which outputs driving signals to the fuel injection valves 6, the exhaust gas recirculation control valve 22, etc.

The CPU 5b operates in response to the above-mentioned signals from the sensors to determine operating conditions in which the engine 1 is operating, such as an air-fuel ratio feedback control region and open-loop control regions, and calculates, based upon the determined engine operating conditions, a fuel injection period TOUT over which the fuel injection valves 6 are to be opened, and the valve opening command value LCMD.

The fuel injection by each fuel injection valve is performed in synchronism with generation of each TDC signal pulse over the fuel injection period TOUT which is calculated by the use of the following equation (1):

$$TOUT = TI \times KCMD \times KLAF \times K1 + K2 \quad (1)$$

where TI represents a basic fuel injection amount determined according to the engine rotational speed NE and the intake pipe absolute pressure PBA. A TI map is used for determining a value of TI, which map is stored in the memory means 5c.

KCMD represents a desired air-fuel ratio coefficient which is an equivalent ratio of a desired air-fuel ratio and set according to engine operating conditions.

KLAF represents an air-fuel ratio correction coefficient, which is set, during air-fuel ratio feedback control, such that the air-fuel ratio detected by the LAF sensor 12 becomes equal to the desired air-fuel ratio, whereas during open-loop control it is set to predetermined values suitable for predetermined operating conditions of the engine.

K1 and K2 represent other correction coefficients and correction variables, respectively, which are calculated based on various engine parameter signals to such values depending on engine operating conditions as to optimize characteristics of the engine such as fuel consumption and accelerability.

Further, the CPU 5b calculates a duty ratio DOUT of the ON/OFF control signal to the electromagnetic valve 32 so as to control the state of engagement of the locking-up mechanism 25 in response to travelling conditions of the vehicle (vehicle speed, throttle valve opening, etc.). When the duty ratio DOUT=0% the locking-up mechanism 25 is completely disengaged, and as the duty ratio DOUT increases therefrom, so does the engaging force of the locking-up mechanism 25. When the duty ratio DOUT=100%, the locking-up mechanism is completely engaged (i.e. the input and output members thereof are directly coupled to each other to inhibit sliding therebetween).

The CPU 5b supplies the driving signals including the above-mentioned control signal, and the ON/OFF control signals to the fuel injection valves 6, the exhaust recirculation control valve 22 and the electromagnetic valve 32, etc. via the output circuit 5d.

Figure 2:
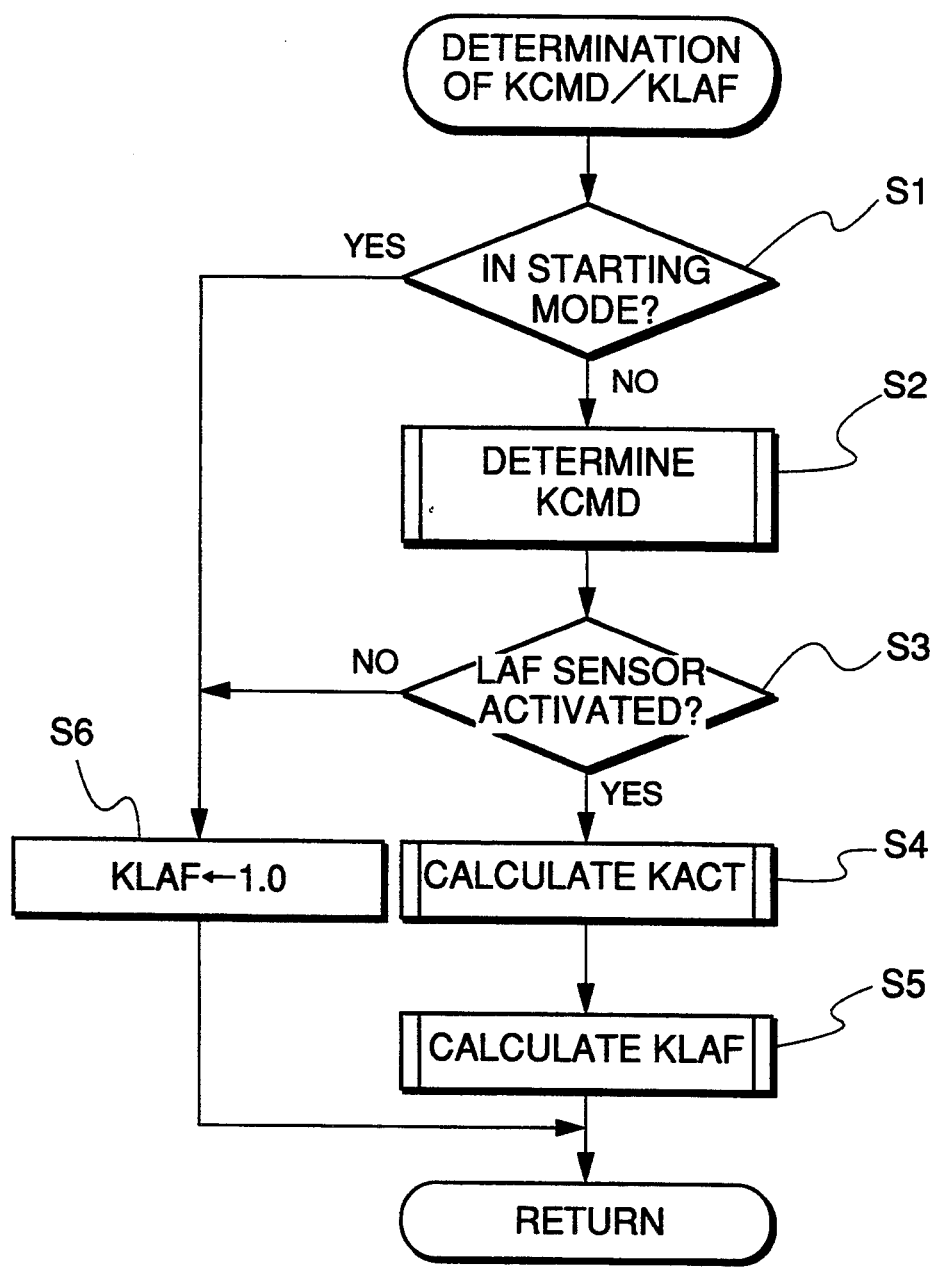
FIG. 2 is a flowchart of a main routine for determining a desired air-fuel ratio coefficient KCMD and an air-fuel ratio correction coefficient KLAF.

FIG. 2 shows a program for determining the desired air-fuel ratio coefficient KCMD and the air-fuel ratio correction coefficient KLAF, which is executed in synchronism with generation of each TDC signal pulse.

Figure 3:
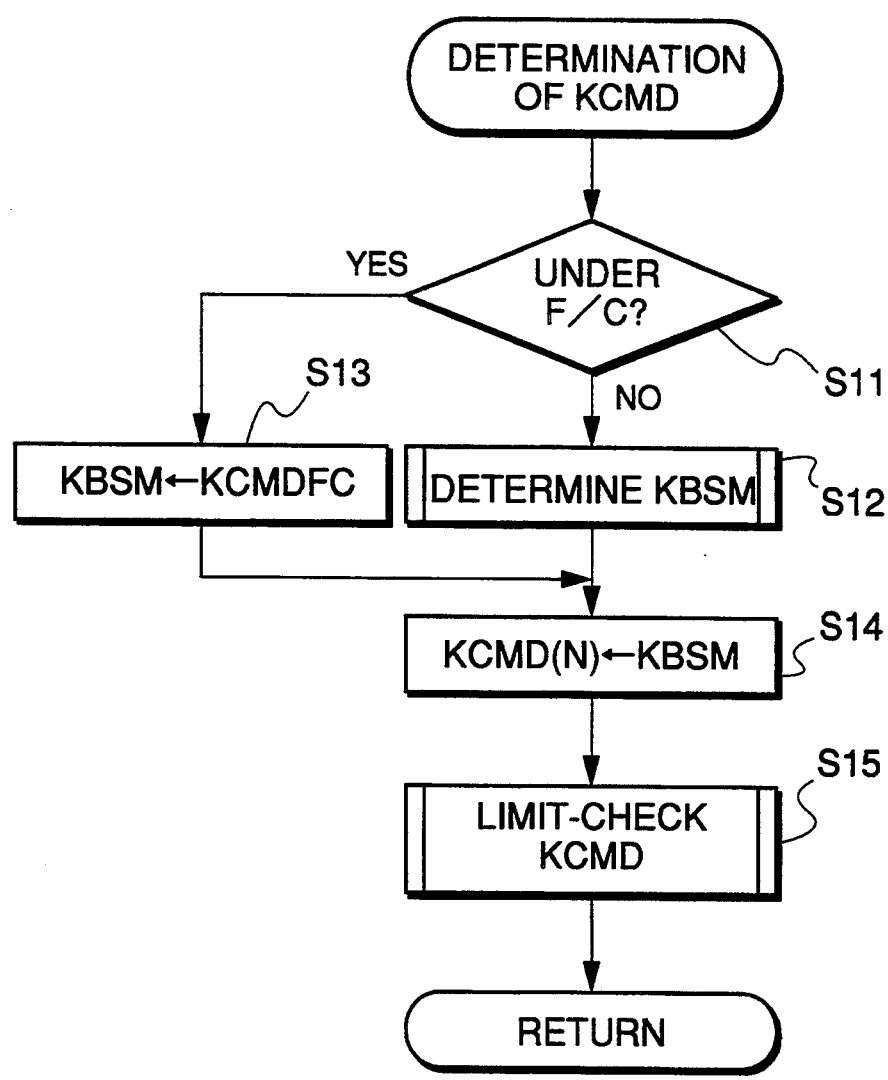
FIG. 3 is a flowchart of a subroutine for determining the desired air-fuel ratio coefficient KCMD.

First, at a step S1, it is determined whether or not the engine is in a starting mode. If the answer to this question is affirmative (YES), the air-fuel ratio correction coefficient KLAF is set to a value of 1.0 at a step S6, and the program is immediately terminated. If the answer to the question of the step S1 is negative (NO), i.e. if the engine is not in the starting mode, a KCMD determining subroutine shown in FIG. 3 is executed at a step S2, and then it is determined at a step S3 whether or not the LAF sensor 12 has been activated (i.e. whether the sensor 12 is capable of detecting oxygen concentration in exhaust gases). If the answer to this question is negative (NO), the program proceeds to the step S6, whereas if the answer is affirmative (YES), a detected air-fuel ratio KACT in terms of an equivalent ratio of the supply air-fuel ratio is calculated, based on the output from the LAF sensor 12 at a step S4, and the air-fuel ratio correction coefficient KLAF is calculated at a step S5 such that the desired air-fuel ratio coefficient KCMD becomes equal to the detected air-fuel ratio KACT, followed by terminating the program.

According to FIG. 2 main routine, if the engine is not in the starting mode, and at the same time the LAF sensor 12 is in the activated state, the air-fuel ratio correction coefficient KLAF is calculated such that the detected air-fuel ratio KACT becomes equal to the desired air fuel ratio coefficient KCMD.

FIG. 3 shows the KCMD determining subroutine for determining the desired air-fuel ratio coefficient KCMD executed by the step S2 in FIG. 2.

At a step S11, it is determined whether or not the engine is under fuel cut. If the answer to this question is negative (NO), i.e. if the engine is not under fuel cut, a basic value KBSM of the desired air-fuel ratio coefficient KCMD is determined at a step S12 by a subroutine shown in FIG. 4, whereas if the answer to the question of the step S11 is affirmative (YES), i.e. if the engine is under fuel cut, the basic value KBSM is set to a predetermined value KCMDFC for fuel cut at a step S13. The predetermined value KCMDFC is used as the immediately preceding value KCMD (N−1) of the KCMD value after termination of fuel cut (see FIG. 11).

Figure 11:
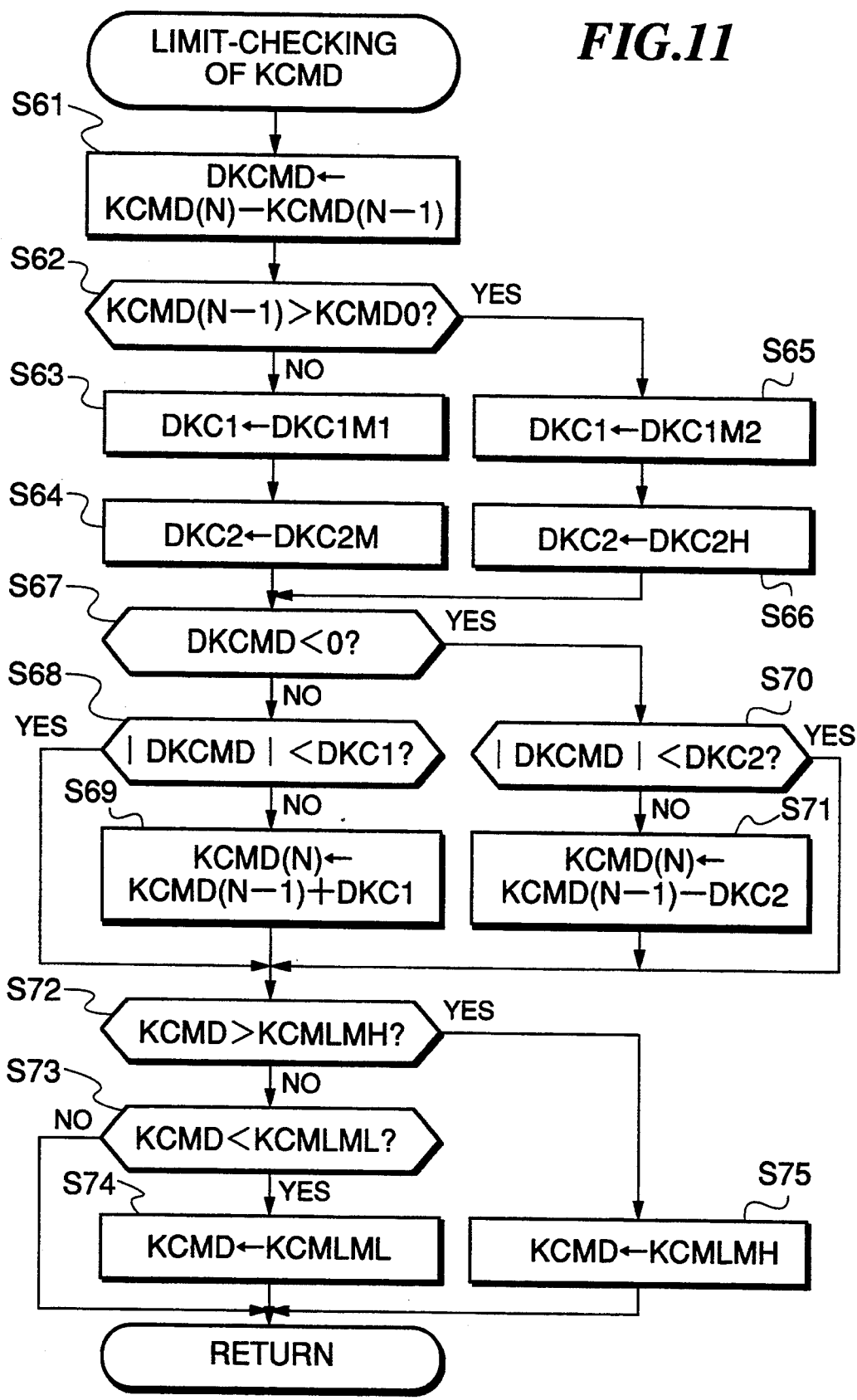
FIG. 11 is a flowchart of a subroutine for limit-checking of the desired air-fuel ratio KCMD.

At a step S14, the basic value KBSM determined at the step S12 or S13 is set to the present value KCMD(N) of the desired air-fuel ratio coefficient KCMD and further a limit check, which will be described in detail with reference to FIG. 11, is carried out at a step S15, followed by terminating the program.

According to the FIG. 3 subroutine, if the engine is not under fuel cut, the basic value KBSM determined by the FIG. 4 subroutine, described below, is set to the desired air-fuel ratio coefficient KCMD(by the steps S12 and S14).

Figure 4:
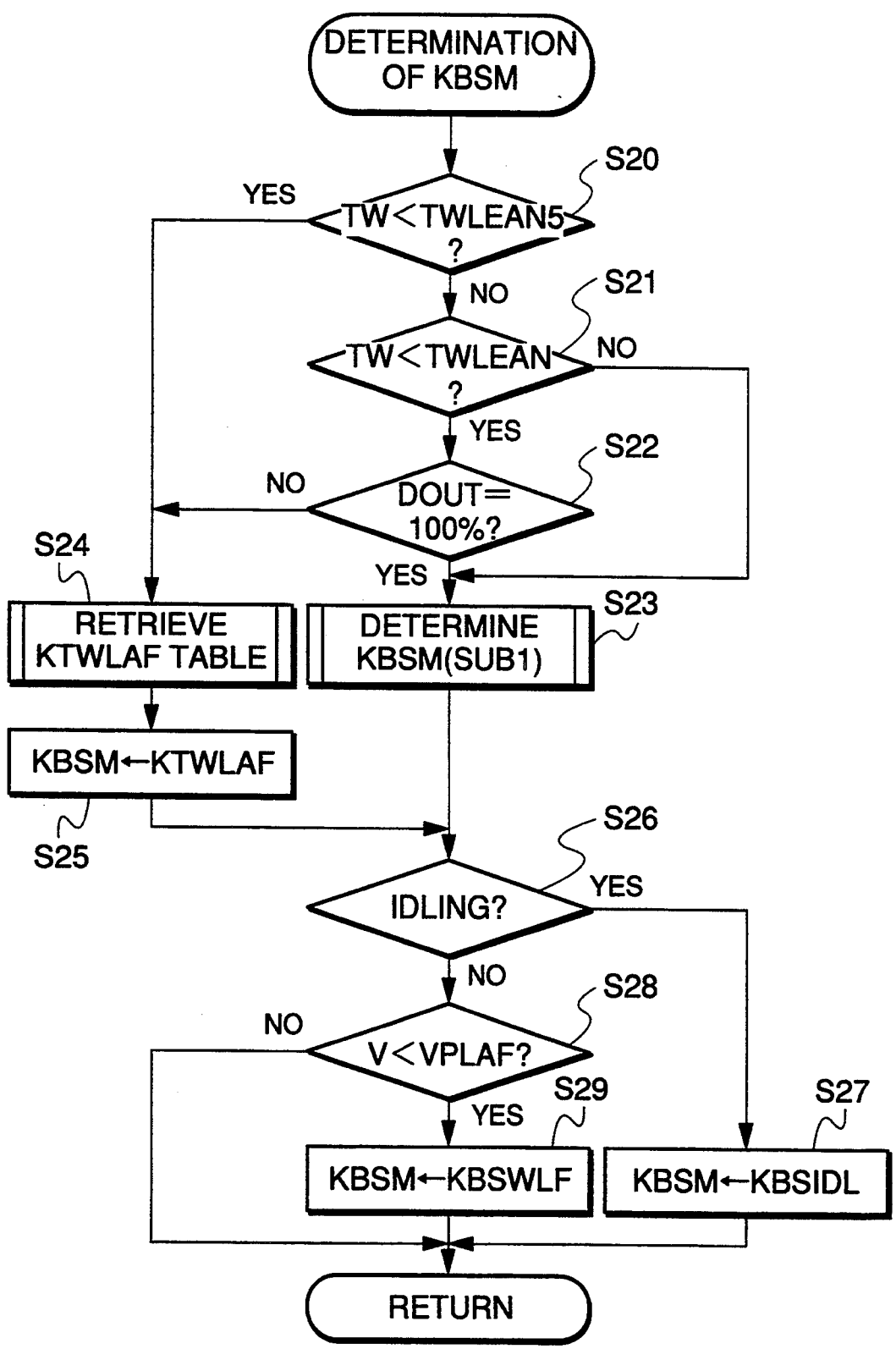
FIG. 4 is a flowchart of a subroutine for determining a basic value KBSM of the desired air-fuel ratio coefficient.

FIG. 4 shows the subroutine for determining the basic value KBSM of the desired air-fuel ratio coefficient KCMD, which is executed at the step S12 in FIG. 3.

First, at a step S20, it is determined whether or not the engine coolant temperature TW is lower than a first predetermined temperature TWLEAN5 (e.g. 65° C.). If the answer to this question is affirmative (YES), i.e. if TW<TWLEAN5, a KTWLAF table is retrieved at a step S24 to determine a desired air-fuel ratio coefficient value KTWLAF suitable for low engine coolant temperatures, and the basic value KBSM is set to the coefficient value KTWLAF at a step S25, followed by the program proceeding to a step S26. The KTWLAF table is set such that values of the coefficient value KTWLAF are equivalent to respective values of the air-fuel ratio richer than the stoichiometric air-fuel ratio, and the higher the engine coolant temperature TW, the smaller the KTWLAF value corresponding thereto.

If the answer to the question of the step S20 is negative (NO), i.e. if TW≧TWLEAN5, it is determined at a step S21 whether or not the engine coolant temperature TW is lower than a second predetermined temperature TWLEAN (e.g. 75° C.). If the answer to this question is negative (NO), i.e. if TW≧TWLEAN, the program immediately proceeds to a step S23, whereas if the answer is affirmative (NO), i.e. if TW<TWLEAN, it is determined at a step S22 whether or not the duty ratio DOUT of the ON/OFF control signal supplied to the electromagnetic valve 32 of the locking-up mechanism 25 is equal to 100%. If the answer to the-question of the step S22 is negative (NO), i.e. if DOUT<100%, the program proceeds to the step S24, while if the answer is affirmative (YES), i e if DOUT=100%, the program proceeds to the step S23. At the step S23, the basic value KBSM is determined by a subroutine shown in FIG. 5, and then the program proceeds to the step S26.

Figure 5:
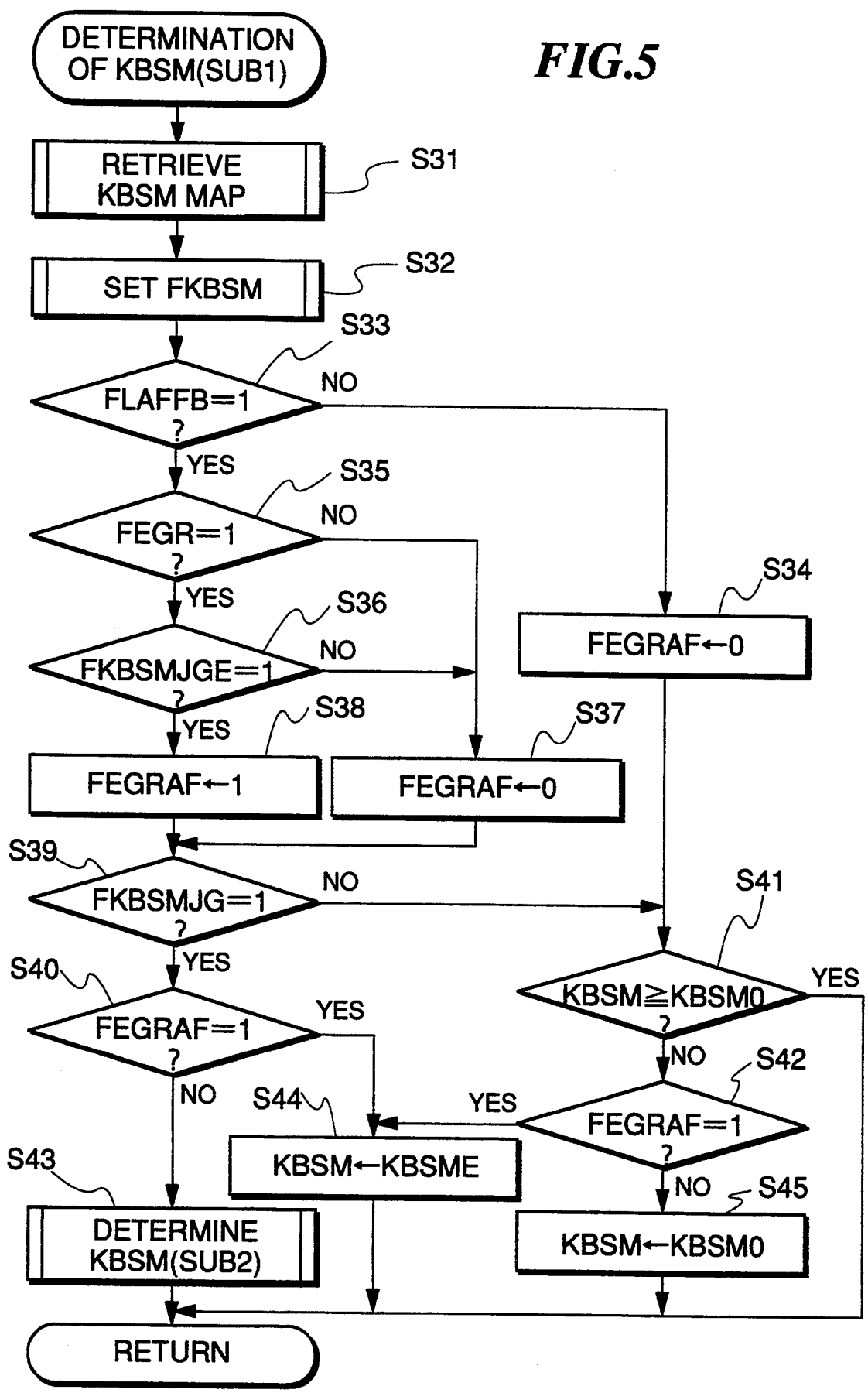
FIG. 5 is a flowchart of a subroutine for determining a basic value KBSM of the desired air-fuel ratio coefficient KCMD.

According to the steps S20 to S25, i.e. if TW<TWLEAN5 or if TWLEAN5≧TW<TWLEAN and at the same time DOUT<100%, which means that the locking-up mechanism 25 is not in the directly coupled state, the desired air-fuel ratio coefficient value KTWLAF is employed as the basic value KBSM, whereas if TW≧TWLEAN or if TWLEAN5≦TW<TWLEAN, and at the same time DOUT=100%, which means that the locking-up mechanism is in the directly coupled state, a value (corresponding to a value of A/F=14.7 or a leaner value) of the basic value KBSM determined by the subroutine described hereinafter with reference to FIG. 5.

At the step S26, it is determined whether or not the engine is idling. If the answer to this question is affirmative (YES), the basic value KBSM is set to a predetermined value KBSIDL suitable for idling (e.g. corresponding to A/F=14.7) at a step S27, followed by terminating the program.

If the answer to the question of the step S26 is negative (NO), i.e. if the engine is not idling, it is determined at a step S28 whether or not the vehicle speed V is lower than a predetermined value VPLAF (e.g. 20 km/h). If the answer to this question is negative (NO), i.e. if V≧VPLAF, the program is immediately terminated, while if the answer is affirmative (YES), i.e. if V<VPLAF, the basic value KBSM is set to a predetermined value KBSWLF (e.g. corresponding to A/F=14.7) suitable for low vehicle speeds at a step S29, followed by terminating the program.

According to the FIG. 4 subroutine, if the engine coolant temperature TW is equal to or higher than the second predetermined temperature TWLEAN or if TWLEAN5≦TW<TWLEAN and at the same time DOUT=100%, with the vehicle speed V being equal to or higher than the predetermined value VPLAF, the value of the basic value KBSM determined by the FIG. 5 subroutine is employed at the step S23, which subroutine will be described below.

Figure 8:
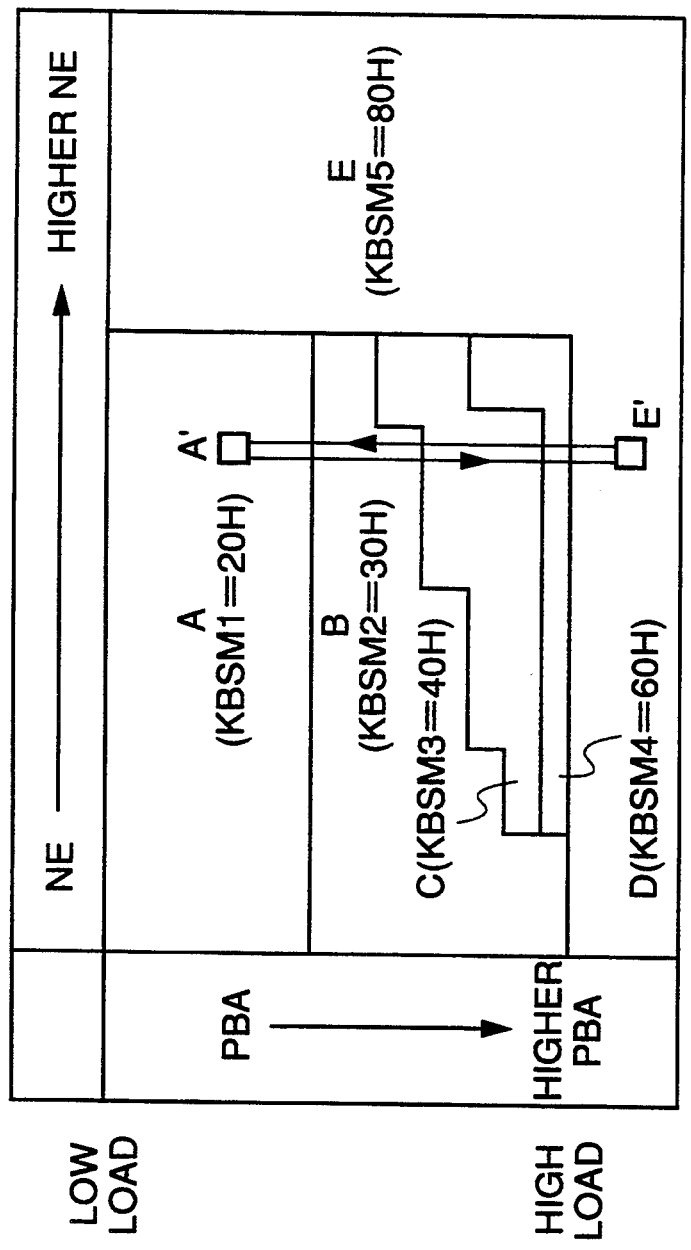
FIG. 8 shows a map for determining the basic value KBSM of the desired air-fuel ratio KCMD.

Referring now to FIG. 5, first at a step S31, a KBSM map is retrieved according to the engine rotational speed NE and the intake pipe absolute pressure PBA detected. The KBSM map is set, e.g. as shown in FIG. 8, such that predetermined map values KBSM1 to KBSM5 (having respective values of 20 H, 30 H, 40 H, 60 H and 80 H, H designating that each value is a hexadecimal digit) of the basic value KBSM correspond to regions A to E defined according to the engine rotational speed NE and the intake pipe absolute pressure PBA. The map values KBSM1 to KBSM 5 correspond to values of A/F=22, A/F=20, A/F=18, A/F=16, and A/F=14.7, respectively.

Figure 6:
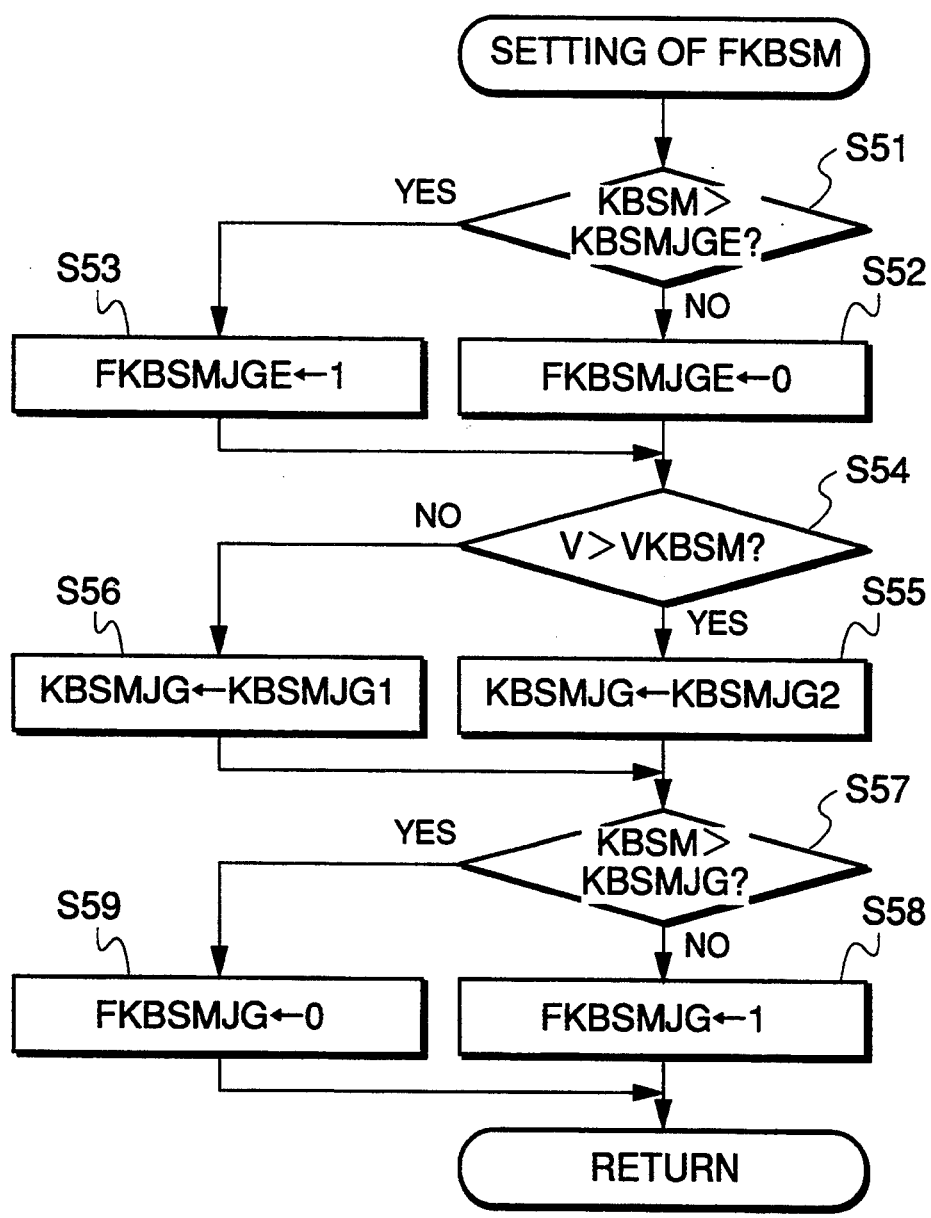
FIG. 6 is a flowchart of a subroutine for setting flags used in the subroutine of FIG. 5.

At the following step S32, an FKBSM-setting subroutine, shown in FIG. 6, is executed for setting a lean burn permission flag FKBSMJG and an EGR (exhaust gas recirculation) desired A/F preliminary permission flag FKBSMJGE.

Referring to FIG. 6, first, at a step S51, it is determined whether or not the map value of the basic value KBSM obtained at the step S31 in FIG. 5 is larger than an EGR desired A/F preliminary permission threshold KBSMJGE. If the answer to this question is affirmative (YES), i.e. if KBSM>KBSMJGE, the flag FKBSMJGE is set to a value of 1 at a step S53, whereas if the answer is negative (NO), i.e. if KBSM≦KBSMJGE, the flag FKBSMJGE is set to a value of 0 at a step S52. The flag FKBSMJGE, when assuming a value of 1, indicates that the desired A/F (i.e. the desired air-fuel ratio coefficient KCMD) for exhaust gas recirculation can be applied. Further, when the threshold KBSMJGE is set to a value of 3FH (a value slightly smaller than a value of 40 H corresponding to a value of the region C) (see FIG. 10). In this connection, the threshold KBSMJGE may be provided with hysteresis for prevention of hunting.

At the following step S54, it is determined whether or not the vehicle speed V is higher than a predetermined value VKBSM (e.g. 80 km/h). If the answer to this question is negative (NO), i.e. if V≦VKBSM, a lean burn permission threshold KBSMJG is set to a threshold value KBSMJG1 suitable for low vehicle speeds, whereas if the answer is negative (NO), i.e. if V>VKBSM, the threshold KBSMJG is set to a threshold value KBSMJG2 suitable for high vehicle speeds. In this connection, threshold values KBSMJG1 and KBSMJG2 are each provided with hysteresis. For instance, the threshold value KBSMJG1 for low vehicle speeds assumes a value of 21 H/5 FH (i.e. the threshold value KBSMJG1 assumes the smaller one of 21 H when the KBSM map value is decreasing, while it assumes the larger one of 5 FH when the KBSM map value is increasing), while the threshold value KBSMJG2 for high vehicle speeds assumes a value of 21 H/7 FH. 21 H is a value slightly larger than a value 20 H (corresponding to the region A), 5 FH is a value slightly smaller than a value 60 H (corresponding to the region D), and 7 FH is a value slightly smaller than a value 80 H (corresponding to the region E).

At the following step S57, it is determined whether or not the KBSM map value is larger than the lean burn permission threshold KBSMJG. If the answer to this question is affirmative (YES), i.e. if KBSM>KBSMJG, it is determined that basic value KBSM falls outside a region for lean burn, so that the lean burn permission flag FKBSMJG is set to a value of 0, while if the answer is negative (NO), i.e. if KBSM≦KBSMJG, it is determined that the basic value KBSM falls within a region for lean burn, so that the flag FKBSMJG is set to a value of 1.

According to the FIG. 6 subroutine, the EGR desired A/F preliminary permission flag FKBSMJGE is set to a value of 0 in the regions A and B in FIG. 8, and to a value of 1 in the regions C, D and E in same. Further, the lean burn permission flag FKBSMJG is set to:

1) a value of 0 in the regions B, C, D and E, and to a value of 1 in the region A, irrespective of the vehicle speed, when the KBSM map value is decreasing (i.e. the load on the engine is decreasing), 2) a value of 0 in the regions E, and to a value of 1 in the region A, B, C, and D, when the KBSM map value is increasing and at the same time the vehicle speed is high (V>VKBSM), and 3) a value of 0 in the regions D and E, and to a value of 1 in the regions A, B, and C, when the KBSM map value is increasing and at the same time the vehicle is low (V≦VKBSM).

Referring back to FIG. 5, at a step S33, it is determined whether or not a LAF feedback flag FLAFFB, which is set to a value of 1 when it is determined based on the output from the LAF sensor 12 that the engine is in an operating condition suitable for the air-fuel ratio feedback control, is equal to 1. If the answer to this question is negative (NO), i.e. if FLAFFB=0, an EGR desired A/F permission flag FEGRAF, referred to hereinbelow, is set to a value of 0 at a step S34, and the program proceeds to a step S41.

If the answer to the question of the step S33 is affirmative (YES), i.e. if FLAFFB=1, it is determined at a step S35 whether or not an EGR ON flag FEGR, which is set to a value of 1 when the EGR (exhaust gas recirculation) is performed, is equal to 1. If the answer to this question is affirmative (YES), it is determined at a step S36 whether or not the EGR desired A/F preliminary permission flag FKBSMJGE is equal to 1. If both the answers to the questions of the steps S35 and S36 are affirmative (YES), i.e. if FEGR=1 and at the same time FKBSMJGE=1, the EGR desired A/F permission flag FEGRAF is set to a value of 1 at a step S38, whereas if either of the answers to these questions is negative (NO), i.e. if FEGR=0 or FKBSMJGE=0, the flag FEGRAF is set to a value of 0 at a step S37. The FEGRAF, when assuming a value of 1, indicates that the desired air-fuel ratio (e.g. A/F=18) suitable for EGR can be employed.

Figure 7:
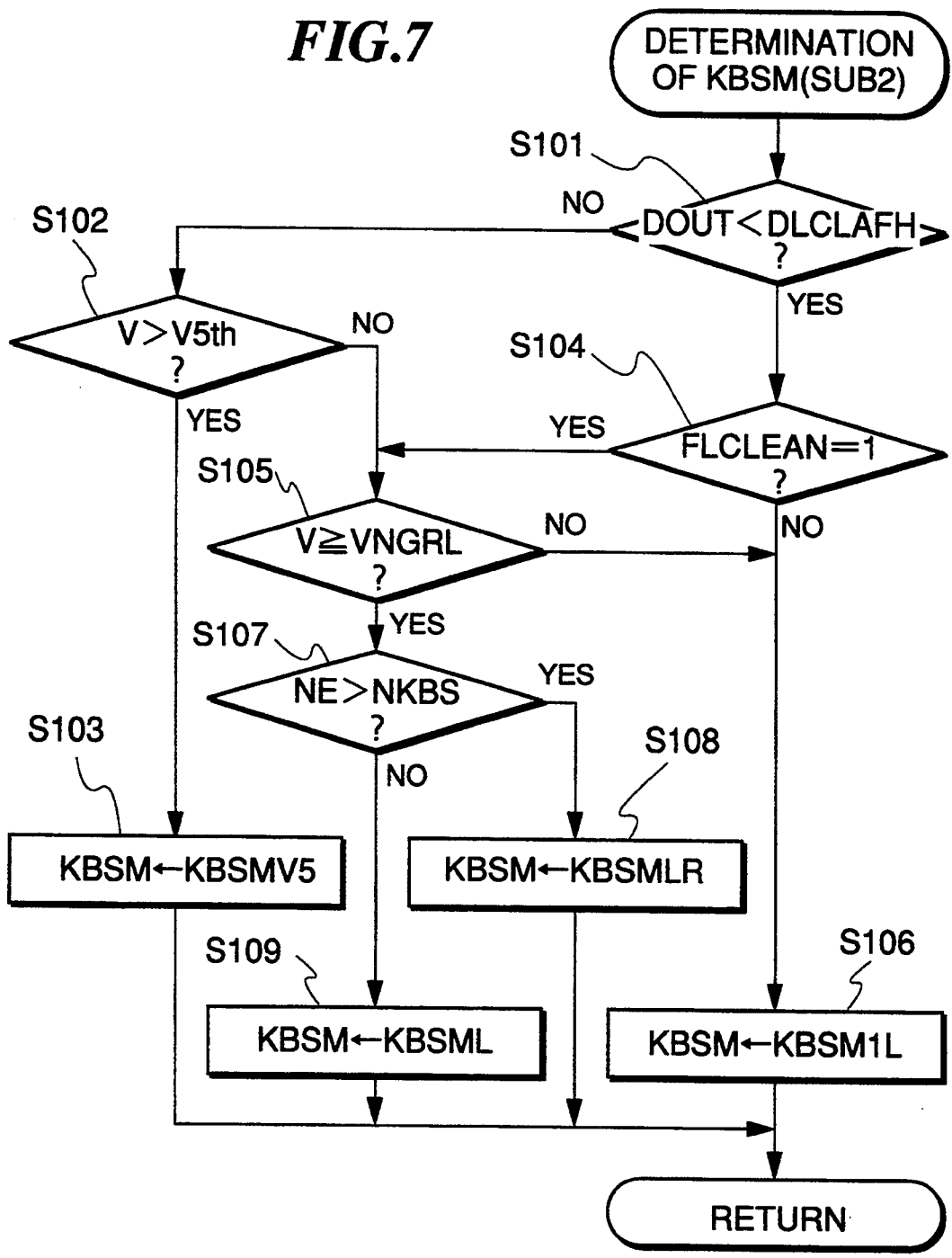
FIG. 7 is a flowchart of a subroutine executed in the subroutine of FIG. 5.

At the following step S39, it is determined whether or not the lean burn permission flag FKBSMJG is equal to 1. If the answer to this question is affirmative (YES), i.e. if FKBSMJG=1, which indicates that the map value KBSM is in the region for lean burn, it is determined at a step S40 whether or not the EGR desired A/F permission flag FEGRAF is equal to 1. If the answer to this question is negative (NO),.i.e. if FEGRAF=0, which means that the desired A/F for EGR cannot be employed, so that the program proceeds to a step S43, where a subroutine shown in FIG. 7 is executed. On the other hand, if the answer to the question of the step S40 is affirmative (YES), i.e. if FEGRAF=1, which means that the desired A/F for EGR can be employed, the basic value KBSM is set to a predetermined value KBSME corresponding to A/F=18 at a step S44, followed by terminating the program.

If the answer to the question of the step S39 is negative (NO), i.e. if FKBSMJG=0, which means that the KBSM map value falls outside the region for lean burn, it is determined at a step S41 whether or not the map value KBSM is equal to or higher than a predetermined value KBSM0 corresponding to A/F=14.7. If the answer to this question is affirmative (YES), i.e. if KBSM≧KBSM0, the program is immediately terminated. Accordingly, as the basic value KBSM, the map value obtained at the step S31 is employed without modification.

If the answer to the question of the step S41 is negative (NO), i.e. if KBSM<KBSM0, it is determined at a step S42 whether or not the EGR desired A/F permission flag FEGRAF is equal to 1. If the answer to this question is affirmative (YES), i.e. FEGRAF=1, the program proceeds to a step S44, where the basic value KBSM is set to the predetermined value KBSME (corresponding to A/F=18), whereas if the answer is negative (NO), i.e. if FEGRAF=0, the basic value KBSM is set to the predetermined value KBSM0 at a step S45, followed by terminating the program.

FIG. 7 shows the aforementioned subroutine to be carried out at the step S43 in FIG. 5.

First, at a step S101, it is determined whether or not the duty ratio DOUT of the ON/OFF control signal supplied to the electromagnetic valve 32 of the locking-up mechanism is smaller than a predetermined value DLCLAFH (e.g. 90%). If the answer to this question is negative (NO), i.e. if DOUT≧DLCLAFH, which means the locking-up mechanism is substantially directly coupled, it is determined at a step S102 whether or not the vehicle speed V is higher than a predetermined higher value V5th (e.g. 105 km/h). If the answer to this question is negative (NO), i.e. if V≦V5th, the program proceeds to a step S105, whereas if the answer is affirmative (YES), i.e. if V>V5th, the basic value KBSM is set to a predetermined value KBSMV5 (e.g. corresponding to A/F=21) suitable for high vehicle speeds at a step S103.

If the answer to the question of the step S101 is affirmative (YES), i.e. if DOUT<DLCLAFH, which means that the engaging force of the locking-up mechanism is small, it is determined at a step S104 whether or not an engagement state flag FLCLEAN is equal to a value of 1. The engagement state flag FLCLEAN is set to the value of 1 when the duty ratio DOUT is larger than 0%, whereas if the duty ratio DOUT is equal to 0%, it is set to a value of 0. If the answer to this question is affirmative (YES), i.e. if FLCLEAN=1, it is determined at a step S105 whether or not the vehicle speed V is equal to or higher than a predetermined lower value VNGRL (e.g. 20 km/h). If either the answer to the question of the step S104 or that to the question of the step S105 is negative (NO), i.e. if FLCLEAN=0, which means that the locking-up mechanism is not engaged at all, or if FLCLEAN=1, and at the same time V<VNGRL, which means that the locking-up mechanism 25 is engaged but the vehicle speed is low, the basic value KBSM is set to a predetermined value KBSM1L (corresponding e.g. to A/F=14.7) suitable for the disengagement of the locking-up mechanism or low vehicle speeds at a step S106. This takes into consideration that even if the locking-up mechanism 25 is engaged (DOUT>0%), the engine output torque can be required to be increased for standing start or acceleration of the vehicle, when the vehicle speed is low.

If the answer to the question of the step S105 is affirmative (YES), i.e. if V≧VNGRL, it is determined at a step S107 whether or not the engine rotational speed NE is higher than a predetermined value NKBS (e.g. 3000 rpm). If the answer to this question is affirmative (YES), i.e. if NE>NKBS, the basic value KBSM is set to a predetermined value KBSMLR (e.g. corresponding to A/F=21.5) for medium-to-high vehicle speeds and high engine rotational speeds at a step S108, whereas if the answer to this question is negative (NO), i.e. if NE≦NKBS, the basic value KBSM is set to a predetermined value KBSML (corresponding e.g. to A/F=22) for medium-to-high vehicle speeds and low engine rotational speeds at a step S109.

FIG. 9 collectively shows manners of setting the basic value KBSM by the FIG. 7 subroutine. In the table, "ND" represents a state in which the basic value KBSM is not dependent on the vehicle speed V or the engine rotational speed NE. More specifically, in the present embodiment, when the engaging force of the locking-up mechanism is large (DOUT≧DLCLAFH), the predetermined value KBSMV5 corresponding to A/F=21.0 is used when the vehicle speed is high (V>V5th), the predetermined value KBSMLR corresponding to A/F=21.5 is used when the vehicle speed is medium (VNGRL≦V≦V5th) and the engine rotational speed NE is high (NE>NKBS), and the predetermined value KBSML corresponding to A/F=22.0 is used when the vehicle speed is medium (VNGRL≦V≦V5th) and the engine rotational speed NE is low (NE≦NKBS). When the vehicle speed is low (V<VNGRL), the predetermined value KBSM1L corresponding to A/F=14.7 is used irrespective of the engine rotational speed NE.

When the engaging force of the locking-up mechanism 25 is not large (DOUT<DLCLAFH), if the vehicle speed is medium to high (V≧VNGRL), the predetermined value KBSML is used when the engine rotational speed NE is high, but the predetermined value KBSMLR is used when the engine rotational speed NE is low, whereas if the vehicle speed is low, the predetermined value KBSM1L is used irrespective of the engine rotational speed NE.

According to the present embodiment, the basic value KBSM of the desired air-fuel ratio coefficient KCMD is set to a value leaner than the value corresponding to the stoichiometric air-fuel ratio, depending on the state of engagement (DOUT) of the locking-up mechanism 25, which makes it possible to carry out proper lean burn control even if the locking-up mechanism is not directly coupled, so as to reduce fuel consumption. Further, the lean desired air-fuel ratio leaner than the stoichiometric valve is modified according to the vehicle speed V (i.e. slightly enriched when the vehicle speed is high, provided that the engaging force of the locking-up mechanism 25 is high (DOUT≧DLCLAFH), which makes it possible to prevent occurrence of surging due to unstable combustion of the mixture especially when the vehicle speed is high (V>V5th). Further, the desired air-fuel ratio is modified (slightly enriched when the engine rotational speed NE is high) depending on the engine rotational speed NE, whereby the engine output torque is maintained at a sufficient level when the engine rotational speed is high, whereby it is made possible to improve drivability.

Next, the manners of setting the basic value KBSM by the FIG. 5 to FIG. 7 subroutines will be described with reference to FIG. 8 to FIG. 10. In the region A in FIG. 8, irrespective of the vehicle speed V (whether or not it is equal to or higher than the predetermined value VKBSM) and of whether the EGR is being carried out or inhibited, the basic value KBSM determined by the FIG. 7 subroutine is used, and in the region E, the basic value KBSM is set to the predetermined value KBSM0.

Figure 10:
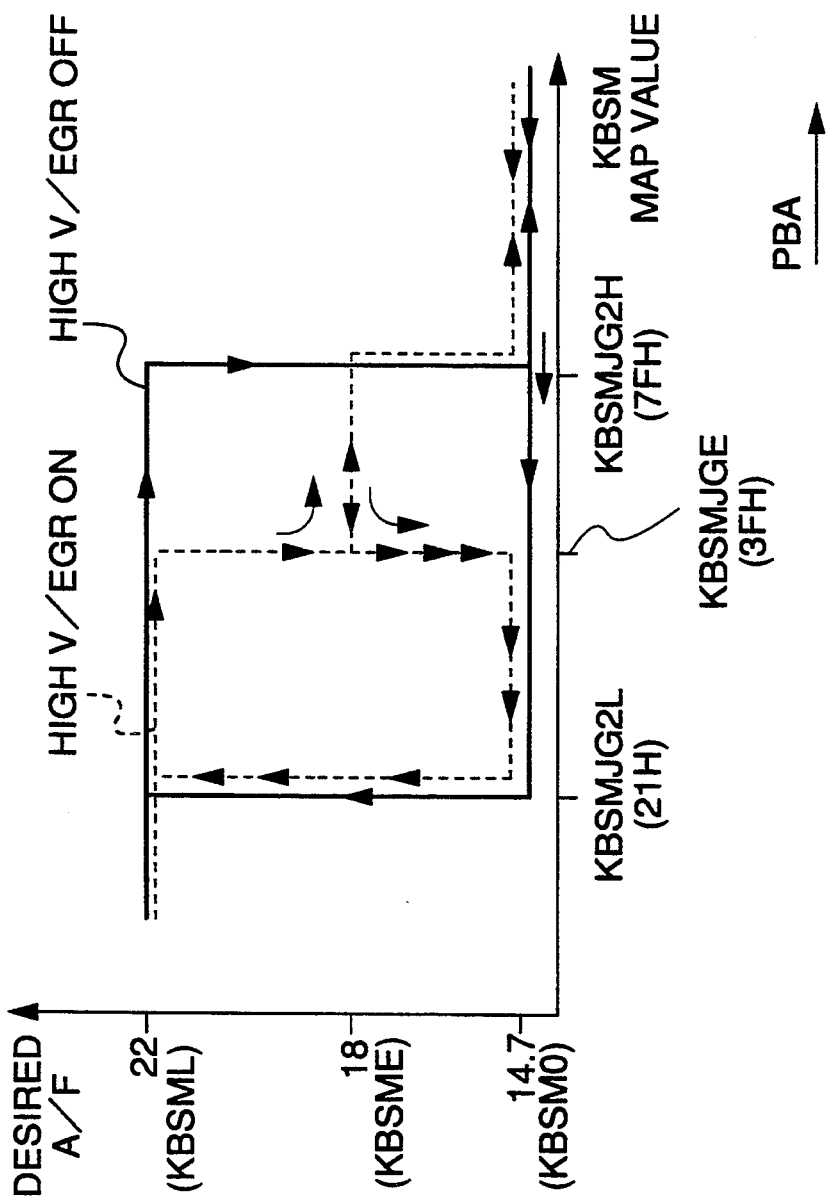
FIG. 10 is a graph which is useful in explaining how the air-fuel ratio control system operates according to the subroutine of FIG. 5.

Further, in the regions B, C, and D, the basic value KBSM is set with hysteresis, the effects of which are illustrated in FIG. 10, in which are shown changes in the basic value KBSM occurring when the KBSM map value shifts from a point A' in the region A shown in FIG. 8 to a point E' in the region E shown in same, or vice versa. However, it should be noted that FIG. 10 shows a case in which the basic value KBSM is set to the predetermined value KBSML (corresponding to A/F=22) when the FIG. 7 subroutine is executed.

First, let it be assumed that the vehicle speed is high (V>VKBSM) and at the same time the EGR is inhibited, if the load on the engine (PBA) is increasing, the basic value KBSM is set to the predetermined value KBSML until the KBSM map value reaches an higher lean burn permission threshold value KBSMJG2H (7 FH), and is set to the predetermined value KBSM0 when the KBSM map value further increases beyond the threshold value KBSMJG2H, as indicated by the solid line in FIG. 10. Therefore, in the regions B, C, D in FIG. 8, the basic value KBSM is set to the predetermined value KBSML.

Further, under the same assumption described above, if the load on the engine (PBA) is decreasing, the basic value KBSM is set to the predetermined value KBSM0 until the KBSM map value reaches a lower lean burn permission threshold value KBSMJG2L (21 H), and is set to the predetermined value KBSML when the KBSM map value further decreases beyond the threshold value KBSMJG2L. Therefore, in the regions B, C, and D in FIG. 8, the basic value KBSM is set to the predetermined value KBSM0.

Further, let it be assumed that the vehicle speed is high and at the same time the EGR is performed, if the load on the engine is increasing, the basic value KBSM is set to the predetermined value KBSML until the KBSM map value reaches the EGR desired A/F preliminary permission threshold KBSMJGE (3 FH), and is set to the predetermined value KBSME when the KBSM map value further increases beyond the threshold value KBSMJGE, and to the predetermined value KBSM0 when the KBSM map value further increases beyond the higher lean burn permission threshold value KBSMJG2H (7 FH). Therefore, in the region B in FIG. 8, the basic value KBSM is set to the predetermined value KBSML, while in the regions C and D, it is set to the predetermined value KBSME.

Under the same assumption, if the load on the engine is decreasing, the basic value KBSM is set to the predetermined value KBSM0 until the KBSM map value reaches the higher lean burn permission threshold value KBSMJG2H (7 FH), to the predetermined value KBSME when it becomes smaller than the threshold value KBSMJG2H and until it reaches the EGR desired A/F preliminary permission threshold KBSMJGE (3 FH), to the predetermined value KBSM0 when it becomes smaller than the threshold value KBSMJGE, and to the predetermined value KBSML when it becomes smaller than the lower lean burn permission threshold value KBSMJG2L (21 H). Therefore, in the regions C and D in FIG. 8, the basic value KBSM is set to the predetermined value KBSME similarly to the case where the load on the engine is increasing, and in the region B, the basic value KBSM is set to the predetermined value KBSM0.

Further, when the vehicle speed is low, the higher lean burn permission threshold value is changed to 5 FH (see the step S55 in FIG. 6), so that in the region D, when the load on the engine is increasing, the basic value KBSM is set to the predetermined values KBSME or KBSM0 depending on whether the EGR is performed or inhibited, respectively, whereby the region in which the lean burn is permitted is narrowed. The rest remains the same.

As described above, according to the present embodiment, when the EGR is performed, in the regions C and D, the desired air-fuel ratio coefficient KCMD (=KBSM) is set to the predetermined value KBSME corresponding to A/F=18, and the air-fuel ratio correction coefficient KLAF is determined such that the detected air-fuel ratio KACT becomes equal to the desired air-fuel ratio coefficient KCMD, which makes it possible to reduce fuel consumption by leaning the air-fuel ratio, to enhance drivability of the engine by reducing the torque shocks caused by undesirable changes in the desired air-fuel ratio, and to satisfy the requirements for the exhaust emission characteristics.

FIG. 11 shows a KCMD limit check subroutine executed at the step S15 in FIG. 3.

At a step S61, it is determined whether or not an amount of change DKCMD in the desired air-fuel ratio coefficient KCMD is calculated as a difference (KCMD (N) −KCMD(N−1)) between a present value KCMD(N) and an immediately preceding value KCMD (N−1), and then at a step S62, it is determined whether or not the immediately preceding value KCMD (N−1) is larger than a predetermined value KCMD0 corresponding to the stoichiometric value. If the answer to this question is negative (NO), i.e. if KCMD(N−1)≦KCMD0, an incremental variable DKC1 corresponding to a rate of change in the desired air-fuel ratio in an enriching direction is set to a predetermined lean-side incremental value DKC1M1 at a step S63, and a decremental value DKC2 corresponding to a rate of change in the desired air-fuel ratio in a leaning direction is set to a predetermined lean-side decremental value DKC2M at a step S64, followed by the program proceeding to a step S67.

If the answer to the question of the step S62 is affirmative (YES), i.e. if KCMD(N−1)>KCMD0, the incremental variable DKC1 is set to a predetermined rich-side incremental value DKC1M2 at a step S65, and then the decremental variable DKC2 is set to a predetermined rich-side decremental value DKC2H, followed by the program proceeding to the step S67.

At the step S67, it is determined whether or not the amount of change DKCMD in the desired air-fuel ratio coefficient KCMD is a negative value. If the answer to this question is affirmative (YES), i.e. if the desired air-fuel ratio coefficient KCMD has decreased, it is determined at a step S70 whether or not the absolute value of the amount of change DKCMD is smaller than the decremental variable DKC2. If the answer to this question is negative (NO), i.e. if |DKCMD|≧DKC2, the present value KCMD(N) of the desired air-fuel ratio is changed to the difference of KCMD(N−1) minus DKC2 at a step S71 and then the program proceeds to a step S72, whereas if the answer is affirmative (YES), the program jumps over to the step S72.

If the answer to the question of the step S67 is negative (NO), i.e. if DKCMD≧0, which means that the desired air-fuel ratio coefficient KCMD has increased, it is determined at a step S68 whether or not the absolute value of the amount of change DKCMD is smaller than the incremental variable DKC1. If the answer to the step S68 is negative (NO), i.e. if |DKCMD|≧DKC1, the present value KCMD(N) of the desired air-fuel ratio is changed to the sum of KCMD(N−1) plus DKC1 at a step S69 and then the program proceeds to the step S72, whereas if the answer is affirmative (YES), the program jumps over to the step S72.

According to the steps S67 to S71, if the absolute value of the amount of change DKCMD of the desired air-fuel ratio coefficient KCMD is larger than the incremental value DKC1 or the decremental value DKC2, the present value KCMD(N) thereof is changed to a value calculated from the value DKC1 or DKC2 and the immediately preceding value KCMD(N−1), to thereby prevent a drastic change in the KCMD value, which would result in degradeddrivability of the engine.

At the following steps S72 to S75, a limit check of the KCMD value is carried out. More specifically, the KCMD value is compared with a predetermined upper limit value KCMLMH or a predetermined lower limit value KCMLML at a step S72 or at a step S73. If the KCMD value is larger than the upper limit value KCMLMH, the KCMD value is set to the predetermined upper limit value KCMLMH at a step S75, whereas if the KCMD value is smaller than the predetermined lower limit value KCMLML, the KCMD value is set to the predetermined lower limit value KCMLML at a step S74, followed by terminating the program.

Figure 12:
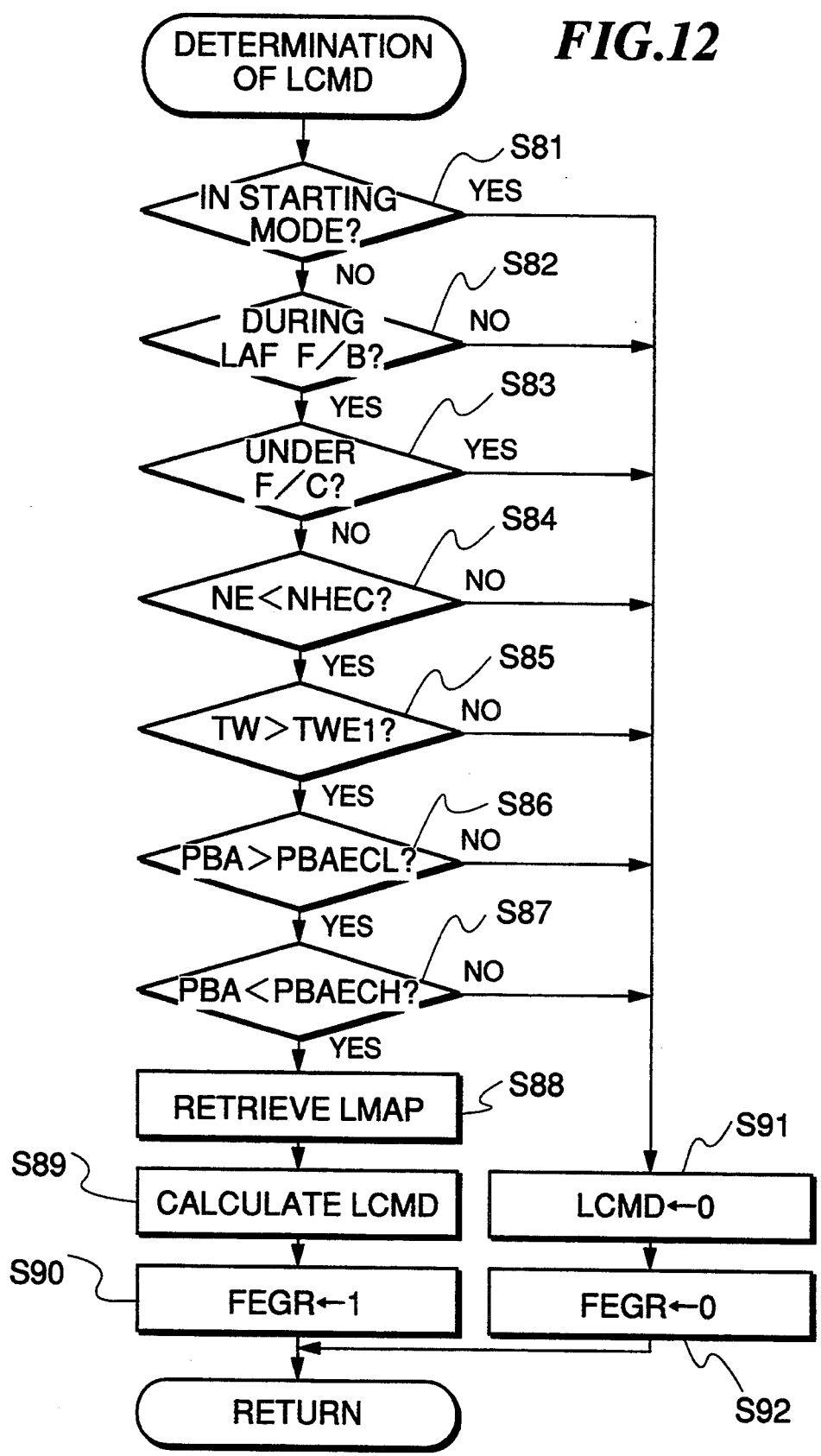
FIG. 12 is a flowchart of a routine for determining a desired value (valve opening command value) LCMD of valve opening of an exhaust gas recirculation control valve of an exhaust gas circulation system.

FIG. 12 shows a routine for determining the valve opening command value LCMD of the exhaust gas recirculation control valve.

At steps S81 to S87, it is determined whether or not the engine is in an operating condition which permits the EGR. More specifically, it is determined whether or not the engine is in the starting mode (step S81), whether or not the air-fuel ratio feedback control is being carried out based on the output from the LAF sensor (step S82), whether or not the engine is under fuel cut (step S83), whether or not the engine rotational speed NE is lower than a predetermined value NHEC (e.g. 4,500 rpm) (step S84), whether or not the engine coolant temperature TW is higher than a predetermined value TWE1 (e.g. 75° C.) (step S85), and whether or not the intake pipe absolute pressure PBA falls within a range defined by predetermined upper and lower limit values PBAECH and PBAECL (e.g. 500 mmHg and 200 mmHg, respectively) (steps S86 and S87). If both the answers to the questions of the steps S81 and S83 are negative (NO), and at the same time all the answers to the questions of the steps S82 and S84 to S87 are affirmative (YES), it is judged that the EGR can be carried out, so that the following steps S88 to S90 are carried out, whereas if either of the answers to the questions of the steps S81 and S83 is affirmative (YES), or if any of the answers to the questions of the steps S82 and S84 to S87 is negative (NO), it is judged that the EGR cannot be carried out, so that the LCMD value is set to 0 at a step S91, and the EGR flag FEGR is set to 0 at a step S92.

Figure 13:
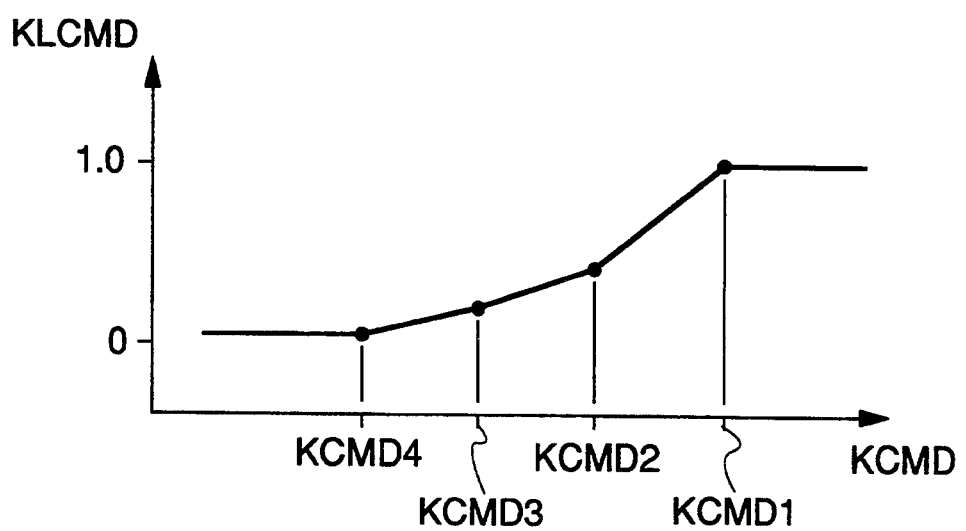
FIG. 13 shows a table for determining a correction coefficient KLCMD for the valve opening command value LCMD of the exhaust gas recirculation system, depending on the desired air-fuel ratio coefficient KCMD.

At the step S88, a map value LMAP of the valve lift amount of the exhaust recirculation control valve is determined according to the engine rotational speed NE and the intake pipe absolute pressure PBA, and then the LCMD value is calculated at a step S89 by the use of the following equation (2):

$$LCMD = LMAP \times KLCMD \qquad (2)$$

where KLCMD represents a correction coefficient determined according to the desired air-fuel ratio coefficient KCMD as shown in FIG. 13. In FIG. 13, KCMD1 represents a predetermined value corresponding e.g. to A/F=14.7, KCMD2 one corresponding e.g. to A/F=16, KCMD3 one corresponding e.g. to A/F=18, and KCMD4 one corresponding e.g. to A/F=22.

Thus, the valve opening command value LCMD is corrected according to the desired air-fuel ratio coefficient KCMD such that the smaller the KCMD value (the leaner the desired air-fuel ratio set), the smaller the KLCMD value set, by which the map value LMAP is multiplied for correction. Therefore, when the desired air-fuel ratio coefficient KCMD is changed e.g. from a value correspond to A/F=22 to a value corresponding to A/F=14.7, it is possible to perform exhaust gas recirculation at a proper flow rate, so that even if the rate of change in the desired air-fuel ratio coefficient is set to a small value, it is possible to prevent degradation of exhaust emission characteristics. As a result, it is possible to prevent a sudden change in the engine output torque caused by an excessively large rate of change in the desired air-fuel ratio. Further, when the desired air-fuel ratio is in the vicinity of A/F=22, the exhaust gas recirculation can be carried out to the same degree as in the case where the desired air-fuel ratio falls in a range of A/F=16 to 18, to thereby prevent inconvenience of unstable combustion of the mixture.

Further, the method of setting the desired air-fuel ratio to a leaner value than the stoichiometric value depending on the state of engagement (DOUT) of the locking-up mechanism, the vehicle velocity V and the engine rotational speed NE, as described in the above embodiment, is not restricted to a case where the air-fuel ratio is feedback-controlled, but it may also be applied to a case where the open loop control of the air-fuel ratio is carried out.

What is claimed is:

1. In an air-fuel ratio control system for an internal combustion engine, said engine being installed on an automotive vehicle having an automatic transmission provided with a locking-up device, said control system controlling the air-fuel ratio of an air-fuel mixture supplied to said engine to a predetermined air-fuel ratio leaner than a stoichiometric air-fuel ratio when said locking-up device is engaged, the improvement comprising air-fuel ratio-setting means for setting said predetermined air-fuel ratio to a value depending on whether said locking-up device is fully engaged or partially engaged.

2. An air-fuel ratio control system according to claim 1, wherein said air-fuel ratio-setting means sets said predetermined air-fuel ratio according to rotational speed of said engine.

3. An air-fuel ratio control system according to claim 1, wherein said air-fuel ratio-setting means sets said predetermined air-fuel ratio according to travelling speed of said vehicle.

4. An air-fuel ratio control system according to claim 2, wherein said air-fuel ratio-setting means sets said predetermined air-fuel ratio according to the travelling speed of said vehicle.

5. An air-fuel ratio control system according to claim 1, including means for setting the air-fuel ratio of said mixture to a leaner value over a predetermined range of load on said engine when said load on said engine is increasing than when said load on said engine is decreasing.

6. An air-fuel ratio control system according to claim 1, wherein said engine includes an exhaust gas recirculation system, said air-fuel ratio control system including an EGR air-fuel ratio-setting means for setting the air-fuel ratio of said mixture to a value suitable for operation of said exhaust gas recirculation system, said air-fuel ratio-setting means setting said predetermined air-fuel ratio to said value depending on whether said locking-up device is fully engaged or partially engaged, when said EGR air-fuel ratio-setting means is not in operation.

* * * * *